United States Patent [19]
Kenney

[11] 4,004,467
[45] Jan. 25, 1977

[54] CONVEYOR BELTING

[75] Inventor: Michael John Kenney, Sutton Coldfield, England

[73] Assignee: Dunlop Limited, London, England

[22] Filed: Apr. 11, 1975

[21] Appl. No.: 567,310

Related U.S. Application Data

[63] Continuation of Ser. No. 382,339, July 25, 1973, abandoned.

[30] Foreign Application Priority Data

Aug. 3, 1972 United Kingdom ............ 36219/72

[52] U.S. Cl. ............................ 74/233; 74/231 CB; 74/237

[51] Int. Cl.² .................... F16G 5/16; F16G 1/00; F16G 1/22

[58] Field of Search ............ 74/232, 233, 234, 237, 74/231 CB; 161/57

[56] References Cited

UNITED STATES PATENTS

| | | | |
|---|---|---|---|
| 2,684,315 | 7/1954 | Spicer | 74/232 UX |
| 2,711,778 | 6/1955 | Waugh | 74/233 |
| 2,793,150 | 5/1957 | Deeaves | 74/237 X |
| 3,416,383 | 12/1968 | Jensen et al. | 74/233 |
| 3,584,516 | 6/1971 | Burpulis | 74/233 |
| R26,731 | 12/1969 | Robinson | 161/57 |

Primary Examiner—Leonard H. Gerin
Attorney, Agent, or Firm—Stevens, Davis, Miller & Mosher

[57] ABSTRACT

Conveyor belting which is made substantially rigid in a transverse direction by means of at least two spaced-apart layers of high modulus transverse elements one layer either side of a core of compounded material having an average hardness of at least 75 BS degrees of hardness, of which the following is a Specification.

12 Claims, 3 Drawing Figures

CONVEYOR BELTING

This is a continuation of application Ser. No. 382,339 filed July 25, 1973 now abandoned.

This invention relates to conveyor belting and in particular to belting which has a substantial degree of transverse rigidity such as may be used for passenger conveying.

It has already been proposed to stiffen such conveyor belting by providing two spaced-apart layers of transversely-extending, mutually-parallel, individually-flexible metal cords as a reinforcement within flexible plastic material constituting the belting. Such a structure is disclosed in U.K. Specification No. 974,131 or its U.S. equivalent U.S. Pat. No. 26,731.

According to one aspect of the present invention conveyor belting comprises a core of flexible compounded polymeric material and at least two spaced-apart layers of high modulus elements one each side of the core, the elements in each layer lying substantially at right angles to the length of the belting, the said elements being bonded to a polymeric material, wherein the average hardness of the compounded polymeric material of the core is at least 75 BS degrees of hardness whereby the spacing of the layers of transverse elements and the average hardness of the compounded material core confer on the belting a substantial degree of transverse rigidity. The high modulus elements may be individually flexible and may comprise flexible metal cords which may be plated to assist bonding to the polymeric material.

The compounded polymeric material may comprise a single material such as hard rubber, a mixture of polymeric materials, superimposed layers of polymeric material or polymeric material compounded with a filler. In each case the average hardness per unit thickness of the polymeric material of the core must be at least 75 BS degrees of hardness which is equal to 75 ASTM Standard D 1415.

For passenger applications the generally accepted maximum transverse deflection of the belting is as quoted in BS 2655: Part 4: 1969 Rule 3.3.7 i.e. that when an edge supported belt is fully tensioned, and a load of 68 kg is applied centrally between the edge supports by means of a metal plate 150 mm × 250 mm × 20 mm thick placed with its longitudinal axis along the belt, the deflection at the centre shall not exceed 0.01L where L is the distance between the edge supports.

Such deflection in a transverse direction may now be achieved with a 12.7 mm spacing of transverse metal cord layers by using an average core hardness of 75 BS degrees of hardness and, with spacings of 9.5 mm and 6.4 mm, average core hardnesses of 80° and 85° BS degree of hardness, respectively.

Such hardnesses for the compounded core material may be obtained in many ways and fillers of carbon black, phenolic resin, unfluxed polypropylene powder and glass micro-spheres have been shown to be successful, giving sufficient average hardness when compounded in softer polymeric materials as an alternative to using a polymeric material having itself a high hardness value.

Longitudinal reinforcement for the belting may be provided by means of textile or steel fabric or parallel cords of these or other flexible materials such as for example the materials used for the transverse reinforcement dependent on the required tensile strength and elongation for the belting. Such longitudinal reinforcement, if embedded within the core between the transverse layers affects the transverse stiffness only insofar as it affects the average hardness of the core. The longitudinal reinforcement may or not be bonded to the polymeric material dependent on the required belt rating.

Some examples of belting according to the present invention will now be described, by way of example only, in conjunction with the attached diagrammatic drawings in which.

Figure 1:
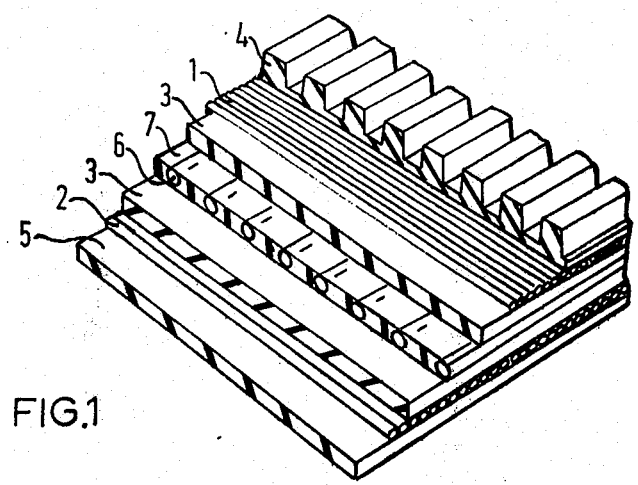
FIG. 1 is a step sectional view of the belting according to the invention.

Two spaced-apart layers 1,2 of mutually parallel, transversely-extending metal cords are positioned one layer either side of a core 3 of compounded polymeric material. Covering layers 4, 5 of polymeric material are positioned over each layer 1, 2 of metal cords and form the outer layers of the belting. The upper covering layer 4 is grooved in the direction of the length of the belting as is conventional to allow combing at the ends of a conveyor. The metal cords of the transverse layers 1, 2 are bonded to the polymeric material.

Figure 2:
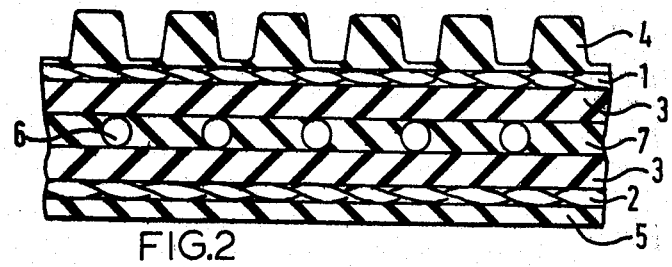
FIG. 2 is a transverse section of alternative belting.
Figure 3:
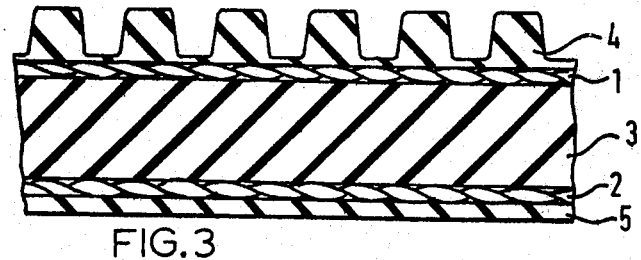
FIG. 3 is a section of belting having no internal longitudinal reinforcement.

In one embodiment as shown in FIG. 1, a longitudinal reinforcement 6 is provided in the central plane of the belting in the form of longitudinally extending parallel steel cords embedded in the core compound. In another embodiment as shown in FIG. 2 the longitudinal reinforcement 6 is in the form of longitudinally-extending parallel steel cords embedded within and bonded to a sheet 7 of compounded rubber. In yet another embodiment no longitudinal reinforcement is included in the body of the belt (see FIG. 3).

Material specifications for the above embodiments are as follows:

EMBODIMENT 1

Transverse cords of brass plated steel at a pitch of 0.195 cm. Each cord comprising six 0.038 cm diameter wires around a central core of three 0.02 cm diameter wires.

| Core compound | | |
|---|---|---|
| Natural rubber | 100.0 | parts by weight |
| Stearic acid | 1.0 | parts by weight |
| Zinc oxide | 5.0 | parts by weight |
| Sulphur | 2.5 | parts by weight |
| N-Cyclohexyl-2-Benzthiazyl Sulphenamide | 0.5 | parts by weight |
| Tetra Methyl Thiuram Disulphide | 0.2 | parts by weight |
| Cerasine wax | 1.0 | parts by weight |
| Antioxidant Flectol Flakes | 3.00 | parts by weight |
| Lamp Black | 70.0 | parts by weight |
| Glass micro-spheres | 25.0 | parts by weight |
| Average hardness 85 BS degrees | | |
| Core thickness .95 cm | | |
| Longitudinal wires | | |
| 3.18 mm diameter steel wires at 2.54 cm pitch. | | |

EMBODIMENT 2

Transverse cords as above.

Main core compound

| -continued | | |
|---|---|---|
| Natural rubber | 100.0 | parts by weight |
| Sulphur | 2.5 | parts by weight |
| N-Cyclohexyl-2-Benzthiazyl Sulphenamide | 0.75 | parts by weight |
| Tetra Methyl Thiuram Disulphide | 0.15 | parts by weight |
| Zinc oxide | 10.0 | parts by weight |
| Antioxidant Flectol Flakes | 2.0 | parts by weight |
| Stearic acid | 5.0 | parts by weight |
| High Abrasion Furnace Black | 20.0 | parts by weight |
| Lamp black | 60.0 | parts by weight |
| Phenolic Resin | 5.0 | parts by weight |
| Average hardness 85 BS degrees | | |
| Sheet 7 compound | | |
| SBR Type Intal 1500, manufactured by The International Synthetic Rubber Co. Ltd. | 70.0 | parts by weight |
| Natural rubber | 30.0 | parts by weight |
| Zinc oxide | 10.0 | parts by weight |
| Sulphur | 2.5 | parts by weight |
| N-Cyclohexyl-2-Benzthiazyl Sulphenamide | 1.5 | parts by weight |
| Stearic acid | 0.5 | parts by weight |
| Antioxidant Flectol Flakes | 2.0 | parts by weight |
| Aromatic oil | 3.5 | parts by weight |
| High Abrasion Furnace Black | 60.0 | parts by weight |
| Cobalt naphthenate | 6.0 | parts by weight |
| Average hardness 74 BS degrees | | |
| Total core thickness 1.27 cm | | |
| Average hardness of core and sheet 7 = 80 BS degrees | | |
| Longitudinal wires | | |
| Cords comprising 7 × 19 – .338 cm diameter Zinc plated steel wires at 1.00 cm pitch | | |

EMBODIMENT 3

Transverse cords as above

| Core compound | | |
|---|---|---|
| Natural rubber | 100.0 | parts by weight |
| Sulphur | 2.5 | parts by weight |
| N-Cyclohexyl-2-Benzthiazyl Sulphenamide | 0.7 | parts by weight |
| Tetra Methyl Thiuram Disulphide | 0.05 | parts by weight |
| Zinc oxide | 10.0 | parts by weight |
| Antioxidant Flectol Flakes | 2.0 | parts by weight |
| Stearic acid | 5.0 | parts by weight |
| High abrasion furnace black | 17.0 | parts by weight |
| Lamp black | 60.0 | parts by weight |
| Phenolic resin | 17.0 | parts by weight |
| Average hardness 90 BS degrees | | |
| Core thickness .64 cm | | |

In each of the three embodiments the upper and lower covering layers are of compounded neoprene rubber.

The transverse elements of the belting may be in the form of carbon fibres, glass fibres or any other similar material having a high modulus e.g. aromatic polyamide fibres such as the polyparabenzamide of paraphenylene diamine or the polyterephthalamide or paraphenylene diamine.

Having now described our invention, what we claim is:

1. A longitudinally flexible passenger carrying belt which is substantially rigid transversely comprising a core of flexible compounded polymeric material and at least two spaced-apart layers one on each side of the core, each layer having a plurality of high modulus transverse elements, the elements in each layer being substantially straight and individually flexible and positioned substantially at right angles to the length of the belting, the said transverse elements being bonded to a polymeric material wherein the average hardness of the compounded polymeric material of the core is at least 75 BS degrees of hardness whereby the spacing of the layers of transverse elements and the average hardness of the compounded material core confer on the belting a substantial degree of transverse rigidity.

2. Conveyor belting according to claim 1 in which said transverse elements are spaced about 12.7 mm apart.

3. Conveyor belting according to claim 1 in which said transverse elements are spaced about 9.5 mm apart and the average hardness of the compounded polymeric material of the core is about 80 BS degrees of hardness.

4. Conveyor belting according to claim 1 in which said transverse elements are spaced about 6.4 mm apart and the average hardness of the compounded polymeric material of the core is about 85 BS degrees of hardness.

5. Conveyor belting according to claim 1 wherein the core comprises superimposed layers of polymeric material.

6. Conveyor belting according to claim 1 wherein the polymeric material includes a filler material.

7. Conveyor belting according to claim 1 wherein a longitudinal reinforcement is provided within the core of compounded polymeric material.

8. A conveyor belting according to claim 7 wherein the longitudinal reinforcement comprises a layer of fabric.

9. Conveyor belting according to claim 7 wherein the longitudinal reinforcement comprises mutually parallel spaced-apart longitudinally-extending reinforcement members of high modulus material.

10. Conveyor belting according to claim 7 wherein the longitudinal reinforcement members comprise cords.

11. Conveyor belting according to claim 1 wherein the transverse elements comprise cords.

12. In a conveyor belting suitable for carrying human passengers which is flexible longitudinally and substantially rigid transversely and capable of providing a stable platform for the conveyance of passengers when supported at the edges only having a flexible plastic material and embedded therein a composite reinforcement with at least two transversely extending layers of cords arranged substantially continuously and uniformly along the length of the belting, the cords in each layer lying substantially parallel with each other and substantially at right angles to the length of the belting, the improvement comprising the flexible plastic material being a polymeric compound of at least 75 BS degrees of hardness.

* * * * *